Patented Apr. 28, 1953

2,636,898

UNITED STATES PATENT OFFICE 2,636,898

MANUFACTURE OF OXIDATION PRODUCTS FROM UNSATURATED ORGANIC COMPOUNDS

Gerard Dunstan Buckley, Northwich, England, assignor to Imperial Chemical Industries Limited, a corporation of Great Britain No Drawing. Application August 29, 1949, Serial No. 113,021. In Great Britain September 22, 1948

8 Claims. (Cl. 260—496)

This invention relates to the manufacture of oxidation and other products of unsaturated organic compounds by means of nitrous oxide. More particularly it relates to the oxidation of organic compounds and acetylenic compounds by means of nitrous oxide at an elevated pressure and temperature.

It is known that nitrous oxide dissociates into oxygen and nitrogen at about 600° C. and can react with hydrogen at slightly lower temperatures. It is also known that at very high temperatures mixtures of certain organic compounds with relatively large proportions of nitrous oxide are combustible and yield carbon dioxide and water. It is known that olefines can be oxidised by a number of known oxidising agents, but all such reactions yield a variety of products and in general degrade the olefine so that the products contain fewer carbon atoms. For example, aldehydes and ketones can be obtained by oxidising olefines, but these products contain fewer carbon atoms than the original olefines, and therefore the reaction is not so useful as it would be if the product contained as many carbon atoms as the original olefine.

We have found that unsaturated organic compounds can be oxidised by heating them with a limited amount of nitrous oxide at a high pressure. After oxidation, cooling the reaction products and releasing the pressure, the reaction products can be separated from any unreacted material and from nitrogen which is formed simultaneously. Further separation may also be carried out where necessary by fractional distillation.

According to the present invention, therefore, we provide a process for the oxidation of unsaturated organic compounds which comprises heating an unsaturated organic compound with nitrous oxide at a high pressure, cooling and releasing the pressure. In the preferred form of the process we employ not more than 2 volumes, generally not more than 1 volume, of nitrous oxide per volume of unsaturated organic compound measured at the operating temperature and pressure.

The operating temperature is below 500° C. and is preferably below 400° C. In general the reactions are carried out most conveniently at a temperature between 200° and 350° C., though the actual temperature is not critical within this range. The operating pressure exceeds 20 ats. and may be even as high as 2000 ats., but advantageous results are obtained at pressures exceeding 100 ats. and there is no need to exceed 500 ats.

Almost any unsaturated organic compound may be used for this purpose, particularly olefinic compounds and acetylenic compounds. The oxidation of olefinic hydrocarbons according to the present process yields aldehydes or ketones, the aldehydes being obtained from olefines which have a terminal double bond and the ketones being obtained from these and other olefines. The aldehydes and ketones have the same number of carbon atoms as the olefines used except in the case of isoolefines. The yield of aldehydes or ketones depends of course on the reaction conditions, and on the particular material used, but generally the conversion exceeds 50% and can be substantially complete. Any unchanged olefine can readily be separated from the product by fractional distillation.

In the particular case of isoolefines the reaction also gives rise to a cyclopropane derivative. Such cyclopropane derivatives are normally difficult to produce, and the present invention provides a ready means of converting isoolefines into cyclopropane derivatives. In this case we may use isoolefines of general formula

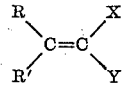

where R and R' are hydrocarbon or substituted hydrocarbon groups, and X and Y are hydrogen or halogen. The reaction apparently proceeds by oxygen replacing the =CXY group in one molecule of isoolefine and addition of this group at the double bond of another molecule of isoolefine. The ketone and cyclopropane derivatives can be separated from the reaction mixture by fractional distillation after allowing the nitrogen byproduct to separate. We can also use olefinic ethers in which the oxygen atom is attached to a carbon atom having a double bond. Certain of these olefinic ethers give rise to esters containing the same number of carbon atoms, e. g. 2,3-dihydropyran gives rise to δ-valerolactone, and vinyl ethers give a formic ester and a cyclopropyl ether. Similarly, ketene-acetals such as

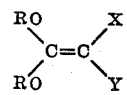

yield carbonic esters and cyclopropane derivatives.

A further case of unsaturated organic compounds is the reaction of acetylenic compounds with nitrous oxide according to this invention. The reaction of an acetylenic compound free from hydroxyl, sulphhydryl or amino groups and in absence of other compounds containing hydroxyl, sulphhydryl or amino groups with nitrous oxide at a high temperature and pressure yields ketenes and dimers thereof. Acetylenic compounds which may be reacted in this way include acetylene, 1-hexyne, allylene, 1-heptyne, 1-octyne, 5-decyne, phenylacetylene, tolane, benzoylacetylene and acetylenedicarboxylic ester. The ketenes produced have the general formula

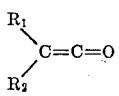

where $R_1$ and $R_2$ are hydrogen or organic residues, and they are highly reactive substances. Because of their instability, they can generally only be kept in the form of their dimers of uncertain constitution. The reaction of acetylenic compounds in presence of compounds having a replaceable hydrogen atom or of acetylenic compounds which themselves have a replaceable hydrogen atom does not stop at the formation of a ketene as described above, apparently because the ketene is unstable and immediately reacts at the olefinic double bond by addition of the replaceable hydrogen atom to the carbon atom attached to the $R_1$ and $R_2$ groups, and addition of the residue to the carbonyl atom. Thus, with water we obtain carboxylic acids; with ammonia and primary and secondary amines we obtain amides; with carboxylic acids we obtain acid anhydrides; with alcohols and phenols we obtain esters; with mercaptans we obtain thioesters. In this process we can react acetylenic compounds such as acetylene, 1-hexyne, 1-octyne, allylene, acetylene dicarboxylic ester, and 5-decyne in presence of alcohols, amides and mercaptans. We can also react acetylenic compounds such as propargyl alcohol and 4-hydroxy-1-butine which themselves already contain hydroxyl or other groups containing replaceable hydrogen atoms.

We believe that the process of reacting nitrous oxide with unsaturated organic compounds proceeds by the formation of an addition compound wherein nitrous oxide is added at the double bond giving a 5-membered ring containing two adjacent carbon atoms, two adjacent nitrogen atoms and an oxygen atom. The exact method of addition may well differ with different unsaturated compounds, and clearly affects the nature of the product.

The process can be carried out in the presence of oxidation catalysts though there is no necessity to do so. Solvents and diluents however are sometimes useful especially where it may be desirable to have present a relatively inert material, such as a saturated hydrocarbon, in order to avoid explosive decomposition. In particular, basic solvents such as tertiary organic bases like dimethylaniline and pyridine accelerate the reaction. In general the amount of the solvent should be as much as or more than the amount of unsaturated compound.

The process may be carried out batchwise by stirring a suitable mixture in a pressure vessel and heating it. After completion of the reaction, which may take from a few minutes to a few hours depending on the reaction conditions, the pressure vessel is cooled and the pressure released. The subsequent separation of the product or products depends naturally upon what is being made, but in general this is carried out by fractional distillation.

In addition to those unsaturated compounds used in the examples, we can use ethylene, 1-butene, 2-butene, tetramethylethylene, 4-propyl-3 - heptene, 1 - dodecene, 2 - methylbutene-1, 1-chloropropene-1, 1-chloroisobutene, cyclopentene, 1-methylcyclopentene, 1-phenylcyclohexene, α-methylstyrene, allyl ether, methallyl alcohol, 4-vinylcyclohexene, allene, allylene, acetylene, butine-2, allyl chloride, ketene dimethyl acetal, phenylketene diethyl acetal, vinyl methyl ether, divinyl ether, dimethallyl, 2:4-hexadiene, methyl oleate, ethyl undecylenate, 2:3-dihydrofuran, 1:2 - dihydrouran, N - vinylphthalimide, vinyl butyl sulphide, vinyl phenyl sulphide, 1-octine, isopropenylacetylene, cyclooctene, cyclooctatetraene and hexatriene.

The process can also be carried out continuously by passing a suitable mixture through a heated vessel and cooling the issuing products and fractionating them as before. In the latter case the proportions are preferably 1 part of nitrous oxide by volume to 1 part of unsaturated compound or unsaturated compound plus diluent measured at the reaction temperature and pressure.

The invention is illustrated but not restricted by the following examples.

*Example 1*

36 parts of cyclohexene are charged to a stirred stainless steel autoclave of capacity approximately double the liquid volume. The air remaining in the vessel is replaced by nitrous oxide, and the autoclave is heated to 300° C. Additional nitrous oxide is then pumped in until the total pressure is 500 atmospheres. After stirring for 1 hour, the pressure is released and the liquid product is distilled giving 26 parts of cyclohexanone and 14 parts of unchanged cyclohexene.

*Example 2*

30 parts of propylene are treated with nitrous oxide as described in Example 1. The temperature is maintained at 250° C. and the pressure at 500 atmospheres for 1½ hours. After cooling and releasing the pressure, the liquid product consists substantially of propionaldehyde.

*Example 3*

A cooled high pressure reaction vessel is half-filled with 20 parts by weight of liquid isobutene. The air remaining in the vessel is replaced by nitrous oxide, the temperature is then raised to 250° C. and nitrous oxide is admitted to a total pressure of 500 atmospheres. These conditions are maintained during 2 hours, after which the reaction vessel is cooled to 60°–70° C. and the contents blown off through a series of traps surrounded by liquid air. The contents of the traps are then allowed to stand for 12 hours in a chamber cooled to −65° C., while the bulk of the nitrous oxide evaporates off. The residue is then distilled through a train of washers maintained at 45°–50° C. and containing sodium bisulphite solution and sodium carbonate solution. The gas is dried by passing it over fused calcium chloride, condensed in a receiver maintained at −20° C., and distilled to give 1.5 parts (by weight) of 1,1-dimethylcyclopropane boiling at 19°–21° C.

*Example 4*

A high pressure reaction vessel is half-filled with 30 parts (by weight) of methylenecyclohexane. The air remaining in the vessel is replaced by nitrous oxide, the temperature is raised to 300° C., and the pressure is then raised to 500 atmospheres by the admission of more nitrous oxide. These conditions are maintained for 4 hours, after which the reaction vessel is cooled to room temperature. The pressure in the vessel is then released, the exit gases being condensed in suitable traps surrounded by liquid air. The nitrous oxide in the traps is allowed to evaporate, and the residue is mixed with the material remaining in the reaction vessel and distilled up to a temperature of 140° C. at 25 mm. Hg. The distillate is washed with sodium bisulphite solution and sodium carbonate solution and with water, and finally dried by standing over fused calcium chloride. The product is then distilled through an efficient column, and 5 parts by weight of 2,5-spirooctane, boiling at 125°–126° C., is collected. Cyclohexanone is recovered from the bisulphite compound by treatment with sodium carbonate. The liberated ketone is separated, dried by standing over anhydrous magnesium sulphate, and distilled. The yield is approximately 5 parts by weight of cyclohexanone boiling at 156° C.

Example 5

50 parts of 2,3-dihydropyran are charged to a stirred stainless steel autoclave of capacity approximately double the liquid volume. The air remaining in the vessel is replaced by nitrous oxide, and the autoclave is heated to 300° C. Additional nitrous oxide is then pumped in until the total pressure is 500 atmospheres. After stirring for 2 hours, the pressure is released and the liquid product is distilled giving 10 parts of δ-valerolactone and 40 parts of unchanged 2,3-dihydropyran.

Example 6

50 parts of 1-hexyne are charged into a stirred stainless steel autoclave of capacity approximately double the liquid volume. The air remaining in the vessel is replaced by nitrous oxide, and the autoclave is heated to 300° C. Additional nitrous oxide is then pumped in until the pressure is 500 atmospheres. After stirring for 1 hour the pressure is released, and the resulting butylketene dimer is purified by distillation under reduced pressure.

Example 7

10 parts of 1-hexyne and 40 parts of ethyl alcohol are charged into a stirred stainless steel autoclave of capacity approximately double the liquid volume. The air remaining in the vessel is replaced by nitrous oxide and the autoclave is heated to 300° C. Additional nitrous oxide is then pumped in until the pressure is 500 atmospheres. After stirring for 1 hour, the pressure is released and the product is distilled to yield 15 parts of ethyl caproate.

The use of 10 parts of phenylacetylene in place of the 1-hexyne results in the production of 12 parts of ethyl phenylacetate.

Example 8

10 parts of phenylacetylene and 30 parts of aqueous ammonia (S. G. 0.88) are charged into a stainless steel autoclave of capacity approximately double the liquid volume. The air remaining in the vessel is replaced by nitrous oxide and the autoclave is heated to 250° C. Additional nitrous oxide is then pumped in until the pressure is 200 atmospheres. The mixture is stirred for 2 hours and after cooling the pressure is released. The resulting phenylacetamide is isolated by filtration.

Example 9

5 parts of 5-decyne and 40 parts of ethylalcohol are reacted with nitrous oxide at 300° C. and 500 atmospheres pressure for 1 hour, as described in Example 7. Distillation of the reaction product gives 6 parts of ethyl nonane-5-carboxylate as a colourless oil of boiling point 110°/114 mm.

Replacement of the 5-decyne in this example by an equal weight of diphenylacetylene gives 6 parts of ethyl diphenylacetate.

Example 10

A cooled high-pressure reaction vessel is half-filled with a solution of 15 parts of acetylene in 30 parts of ethyl alcohol at —40° C. The air remaining in the vessel is replaced by nitrous oxide, the temperature is raised to 300° C. and the pressure is raised to 500 atmospheres by compressing in nitrous oxide. The vessel is stirred under these conditions for 1 hour and is then cooled to 20° C. The pressure is released slowly and the liquid product is fractionally distilled. There is thus obtained 12 parts of an azeotrope, of boiling point 71° C., containing 70% ethyl acetate and 30% ethyl alcohol.

Example 11

A solution of 10 parts of diphenylacetylene in 30 parts of cyclohexane is treated with nitrous oxide by the method of Example 7 at 300° C. and 500 atm. pressure for 1 hour. After cooling and releasing the pressure the product, consisting of diphenylketene dimer of melting point 171° C., is isolated by filtration.

Example 12

A solution of 5 parts of 4-hydroxy-1-butine in 35 parts of cyclohexane is treated with nitrous oxide under the conditions described in Example 7. Fractional distillation of the liquid product yields 5 parts of γ-butyrolactone.

Example 13

10 parts of phenylacetylene and 30 parts of water are treated with nitrous oxide under the conditions of Example 7. After cooling and releasing the pressure the product, consisting of phenylacetic acid, is isolated by filtration.

Example 14

20 parts of 1-heptyne and 20 parts of cyclohexylamine are treated with nitrous oxide under the conditions of Example 7. After cooling and releasing the pressure the solid product, consisting of crude n-heptoic cyclohexylamide, is purified by washing with dilute hydrochloric acid and then with water.

Example 15

A silver-lined stirred autoclave is half filled with 40 parts of 1-chloro-1-propene and the remaining air is swept out with nitrous oxide. The temperature is raised to 280° and nitrous oxide is compressed in to a pressure of 500 atmospheres. The vessel is stirred under these conditions for 4 hours. After cooling and releasing the pressure, the liquid product is fractionally distilled. There is thus obtained 10 parts of monochloracetone and 30 parts of unchanged 1-chloro-1-propene.

Example 16

45 parts of 2:4:4-trimethylpentene-1 are treated with nitrous oxide at 300° C. and 500 atmospheres pressure for 4 hours by the method of Example 1. The product consists of a mixture of equal parts of 4:4-dimethyl-pentan-2-one and 1-methyl-1-neopentylcyclopropane, which may be separated by fractional distillation.

Example 17

45 parts of 2:4:4-trimethylpentene-2 are treated with nitrous oxide at 275° C. and 400 atmospheres pressure for 4 hours by the method of Example 1. Fractional distillation of the product yields 7 parts of 2:4:4-trimethylpentan-3-one of boiling point 136°–137° C.

Use of 45 parts of 2:5-dimethyl-2:4-hexadiene instead of the trimethylpentene results in the production of 9 parts of isopropyl isobutenyl ketone of boiling point 154°–155° C.

Example 18

45 parts of vinyl n-butyl ether are treated with nitrous oxide at 300° C. and 550 atmospheres pressure for 4 hours by the method of Example 1. Fractional distillation of the product yields 25 parts of unchanged vinyl n-butyl ether, 10 parts of n-butyl formate and 15 parts of an azeotrope containing 30% of n-butyl acetate and 70% of cyclopropyl n-butyl ether.

Example 19

5 parts of 1:1-bis-p-methoxyphenylethylene dissolved in 40 parts of light petroleum (B. P. 60°–80° C.) are treated with nitrous oxide at 250° C. and 500 atmospheres pressure for 8 hours by the method of Example 1. After cooling and releasing the pressure, the solid product, consisting of 2.5 parts of pp'-dimethoxy-benzophenone is filtered off. Evaporation of the filtrate leaves 2.5 parts of crude 1:1-bis-p-methoxyphenylcyclopropane, which may be further purified by crystallisation from methanol.

Example 20

A solution of 5 parts of acenaphthylene in 40 parts of cyclohexane is treated with nitrous oxide at 300° C. and 500 atmospheres pressure for 5 hours by the method of Example 1. After cooling and releasing the pressure, the solution is filtered and the cyclohexane is removed by distillation. There then remain 3 parts of acenaphthenone of melting point 118° C.

Example 21

A mixture of 20 parts of cyclohexene and 20 parts of dimethylaniline is treated with nitrous oxide at 220° C. and 500 atmospheres pressure for 2 hours by the method of Example 1. Fractional distillation of the product yields 10 parts of cyclohexanone.

What is claimed is:

1. A process for the oxidation of an unsaturated compound selected from the group consisting of non-aromatic compounds having olefinic unsaturation and non-aromatic compounds having acetylenic unsaturation, which comprises reacting such a compound with nitrous oxide, in the substantial absence of free oxygen, at a pressure of between 20 and 2000 atmospheres and at a temperature of between 200 and 500° C., thereafter cooling the reaction mixture, releasing the pressure and recovering the resulting oxidation product, the reactants being employed in proportions of not more than two volumes of nitrous oxide per volume of unsaturated organic compound measured at the operating temperature and pressure.

2. The process of claim 1, wherein the reaction is carried out at a temperature between 200 and 350° C. and at a pressure exceeding 100 atmospheres.

3. The process of claim 1, wherein the unsaturated compound reacted with nitrous oxide is an olefinic hydrocarbon whereby a carbonyl compound, selected from the group consisting of aldehydes and ketones, is obtained as an oxidation product.

4. The process of claim 3, wherein the oxidation product is recovered from any unchanged olefinic hydrocarbon by fractional distillation.

5. The process of claim 1, wherein the unsaturated compound reacted with nitrous oxide is an isoolefine whereby a cyclopropane and ketone are obtained as oxidation products, the latter being separated from the reaction mixture by fractional distillation.

6. The process of claim 1, wherein ketenes and dimers thereof are obtained as the oxidation products by reacting an acetylenic compound, free from hydroxyl and amino groups, with the nitrous oxide.

7. The process of claim 1, wherein carboxylic acids and derivatives thereof are obtained by reacting an acetylene compound and a compound having a replaceable hydrogen atom selected from the group consisting of —OH and >NH with the nitrous oxide.

8. The process of claim 1, wherein cyclopropane ethers are obtained as the oxidation products by reacting a vinyl ether with the nitrous oxide.

GERARD DUNSTAN BUCKLEY.

References Cited in the file of this patent

UNITED STATES PATENTS

| Number | Name | Date |
|---|---|---|
| 1,943,385 | Heckel et al. | Jan. 16, 1934 |
| 1,988,455 | Lenher | Jan. 22, 1935 |
| 1,995,991 | Lenher | Mar. 26, 1935 |
| 2,367,169 | Gardner | Jan. 9, 1945 |

FOREIGN PATENTS

| Number | Country | Date |
|---|---|---|
| 720,683 | France | Feb. 23, 1932 |

OTHER REFERENCES

Dixon et al., "Memoirs and Proceedings, Manchester Lit. Phil. Soc.," vol. 71, pages 15–22 (1926–1927).

Lenher, J. Am. Chem. Soc., vol. 53, pages 2962–2967 (1931).